United States Patent [19]

Williams

[11] 4,367,881
[45] Jan. 11, 1983

[54] VEHICLE STEERING SYSTEM
[75] Inventor: Dwight E. Williams, Lincoln, Nebr.
[73] Assignee: Outboard Marine Corporation, Waukegan, Ill.
[21] Appl. No.: 192,711
[22] Filed: Oct. 1, 1980
[51] Int. Cl.³ .............................................. B62D 9/00
[52] U.S. Cl. ....................................... 280/96; 280/92; 180/150; 114/160
[58] Field of Search ...................... 280/92, 96; 74/496; 114/160, 144 R; 180/150

[56] References Cited
U.S. PATENT DOCUMENTS

| | | | |
|---|---|---|---|
| 809,072 | 1/1906 | McCoy | 114/160 |
| 1,753,039 | 4/1930 | Armstrong | 114/160 |
| 3,248,123 | 4/1966 | Thomas | 280/92 |
| 3,364,781 | 1/1968 | Ulinski | 74/496 |
| 3,396,988 | 8/1968 | Kroening | 280/96 |
| 3,539,195 | 11/1970 | Swanson | 280/92 |
| 3,869,138 | 3/1975 | Allison | 280/93 |
| 3,888,135 | 6/1975 | Goering | 74/496 |
| 4,040,375 | 8/1977 | Atkins et al. | 114/160 |

Primary Examiner—Richard A. Bertsch
Attorney, Agent, or Firm—Michael, Best & Friedrich

[57] ABSTRACT

The steering system includes a rotatable steering control member located remotely from a steerable dirigible wheel unit, a drive sprocket mounted for common rotation with the steering control member, a short length of roller or sprocket chain trained about the drive sprocket, a driven sprocket mounted for common rotation with the dirigible wheel unit, a short length of roller or sprocket chain trained about the driven sprocket, and flexible members, such as wire cables, interconnecting the chains so that the driven sprocket is rotated in response to rotation of the drive sprocket. Two sets of coaxially aligned pairs of pulley are located between the drive and driven sprockets and the cables are trained over the same sides of the pulleys in each set and thereby are guided through a circuitous route between the sprockets. One set of pulleys is adjustably mounted relative to the cables for adjusting the tension applied on the cables to remove slack therefrom.

7 Claims, 3 Drawing Figures

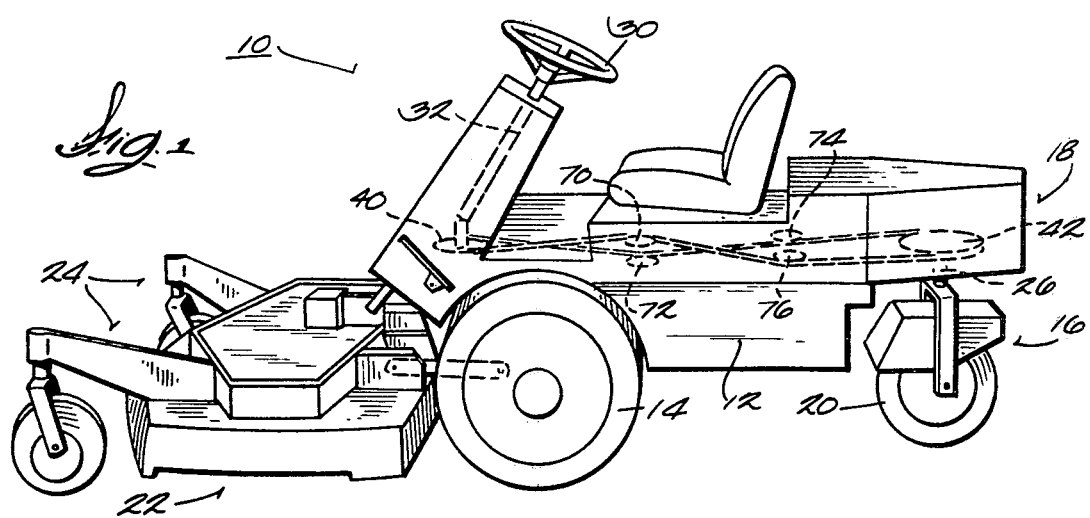
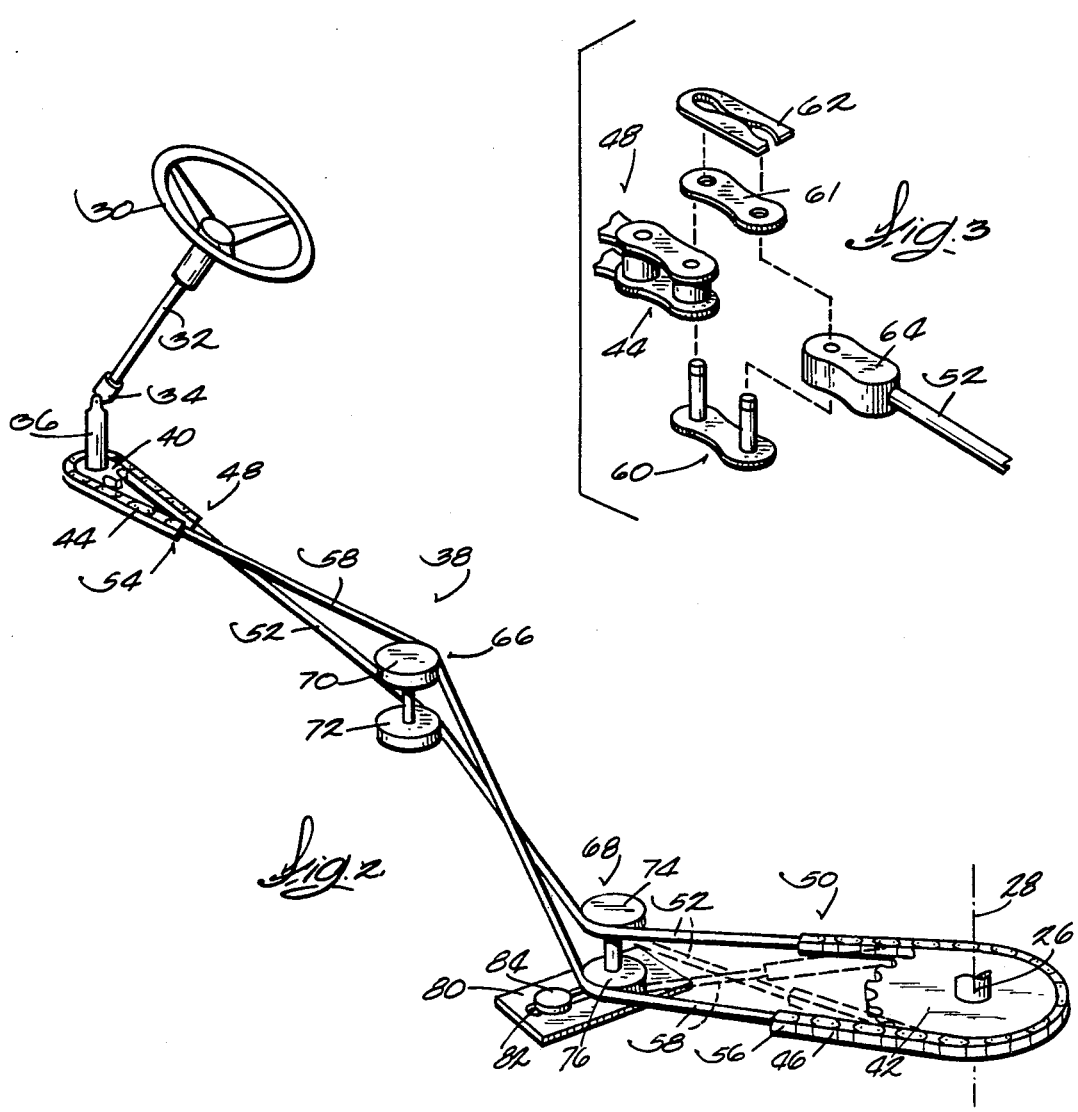

VEHICLE STEERING SYSTEM

BACKGROUND OF THE INVENTION

This invention relates to steering systems and, more particularly, to steering systems for vehicles including a steerable dirigible wheel unit located remotely from the operator's steering control.

Vehicles such as riding lawn mowers, industrial lift trucks and the like commonly include a rear dirigible wheel unit which is actuated by a steering wheel located some distance away at the front of the vehicle. Various steering systems have been used for operatively connecting the steering wheel to the dirigible wheel unit including hydraulic and electro-mechanical systems which are quite expensive, steering gear and mechanical linkage systems which generally are not suitable unless there is little or no obstruction between the steering wheel and the dirigible wheel unit, and cable and pulley systems which require the cables to be kept quite tight in order to prevent slippage; a troublesome requirement with changes in ambient temperatures.

Representative prior constructions of steering systems including cables and/or sprockets chains are disclosed in the following United States patents:

| Patentee | Patent No. | Issue Date |
| --- | --- | --- |
| McCoy | 809,072 | Jan. 2, 1906 |
| Armstrong | 1,753,039 | April 1, 1930 |
| Thomas | 3,248,123 | April 26, 1966 |
| Ulinski | 3,364,781 | Jan. 23, 1968 |
| Allison | 3,869,138 | March 4, 1975 |
| Goering | 3,888,135 | June 10, 1975 |
| Atkins et al | 4,040,375 | Aug. 9, 1977 |

SUMMARY OF THE INVENTION

The invention provides a steering system for a vehicle including a frame and a steerable dirigible wheel unit rotatably mounted on the frame for rotation about a steering axis to steer the vehicle, which steering system includes a rotatable steering control member rotatably supported from the frame at a location remote from the dirigible wheel unit, a drive sprocket mounted for common rotation with the steering control member, a first section of chain trained about the drive sprocket, a driven sprocket mounted for common rotation with the dirigible wheel about the steering axis, a second section of chain trained about the driven sprocket, a first set of two coaxially aligned pulleys rotatably mounted on the frame between the drive and driven sprockets, a second set of two coaxially aligned pulleys rotatably mounted on the frame between the first set of pulleys and the driven sprocket, and first and second flexible members, such as wire cables, interconnecting the ends of the chain sections such that the driven sprocket is rotated in response to rotation of the drive sprocket. The flexible members are trained over the same side of separate pulleys in each set.

In one embodiment, one set of the pulleys is adjustably mounted relative to the flexible members for adjusting the tension applied on the flexible members by the pulleys to remove slack therefrom.

In one embodiment, the flexible members are interconnected to the chains in crossing relationship so that rotation of the drive sprocket in one direction causes rotation of the driven sprocket in the opposite direction.

In one embodiment, each set includes upper and lower pulleys, one flexible member is trained over one side of the upper pulley in the first set and the opposite side of the lower pulley in the second set and the other flexible member is trained over one side of the lower pulley in the first set and the opposite side of the upper pulley in the second set.

One of the principal features of the invention is the provision of a simplified, reliable steering system for vehicles including obstructions between a steering control a dirigible wheel unit remotely spaced from the steering control.

Another of the principal features of the invention is the provision of such a steering system which requires minimum space.

A further of the principal features of the invention is the provision of such a steering system wherein the steering ratio can be conveniently and inexpensively varied.

Other features, aspects and advantages of the invention will become apparent to those skilled in the art upon reviewing the following detailed description, the drawing and the appended claims.

BRIEF DESCRIPTION OF THE DRAWING

FIG. 1 is a perspective view of a riding lawn mower including a steering system incorporating various of the features of the invention.

FIG. 2 is an enlarged, perspective view, primarily diagrammatic, of the steering system in the mower illustrated in FIG. 1.

FIG. 3 is an enlarged, exploded view of a connection between the ends of the chains and the cables.

Before explaining at least one embodiment of the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Illustrated in the drawing is a riding mower 10 including a chassis or frame 12 supported for travel over the ground by a pair of laterally-spaced front wheels 14 (one shown) and a dirigible wheel unit 16 rotatably mounted on the rear end portion 18 of the frame 12 and including one or more rear wheels 20.

Located forwardly of the front wheels 14 is a cutter blade housing 22 carrying a plurality of rotary cutter blades and supported by a pair of caster wheels 24 for travel over the ground. The cutter blade housing 22 is suitably mounted on the frame for pivotal movement between a lowered, mowing position illustrated in FIG. 1 and a raised, non-mowing position.

The mower 10 is driven by a suitable prime mover (not shown), such an internal combustion engine, a hydraulic motor, or an electric motor, drivingly connected to either the front wheels 14 or the dirigible wheel unit 16 by a suitable transmission (not shown). The cutter blades are driven in the usual manner by a power take off (not shown) drivingly connected to the prime mover.

The dirigible wheel unit 16 includes a steering post or shaft 26 which is suitably supported on the frame 12 for rotation about a generally vertical steering axis 28 to steer the mower 10. Steering movement of the dirigible wheel unit 16 is accomplished by an operator turning a steering control member such as a steering wheel 30. The steering wheel 30 is mounted on a shaft 32 connected, via a universal fitting 34, to a generally vertical stub shaft 36 which is rotatably mounted on the front end portion of the frame 12 and is operably connected to the steering shaft 26 by a steering system 38 in accordance with the invention.

Referring to FIG. 2, the steering system 38 includes a first or drive chain sprocket 40 mounted on the lower end of the stub shaft 36 for common rotaton therewith and a second or driven chain sprocket 42 mounted for common rotation on the steering shaft 26 of the dirigible wheel unit 16.

A first short length or section of roller or sprocket drive chain 44 is trained about the drive sprocket 40 and a second short length or section of roller or sprocket driven chain 46 is trained about the driven sprocket 42. One end 48 of the first or drive chain 44 is connected to one end 50 of the second or driven chain 46 by a first flexible member, such a wire cable 52. The other end 54 of the drive chain 44 is connected to the other end 56 of the driven chain 46 by a second flexible member, such as a wire cable 58. The chains 44 and 46 are of sufficient length to permit the desired rotation of the drive and driven sprockets 40 and 42 without running out of chain.

Various suitable means can be used for connecting the cables 52 and 58 to the ends of the chains 44 and 46. In the specific construction illustrated (FIG. 3), a conventional roller chain connector link 60, including a snap-on side link 61 and a snap-on cap 62, is attached to each end of the chains 44 and 46 and a fitting 64 which mates with the connector link 60 is provided on each end of the cable 52 and the cable 58.

The cables 52 and 58 are guided through a circuitous route to avoid obstructions between the drive sprocket 40 and the driven sprocket 42. This accomplished by training the cables 52 and 58 over first and second sets 66 and 68 of coaxially aligned sheaves or pulleys. More specifically, the cables 52 and 58 are trained over the same side of both the pulleys 70 and 72 of the first set 66 and also are trained over the same side of both the pulleys 74 and 76 of the second set 68. In the specific instructions illustrated, the cable 52 is trained over the opposite sides of the pulleys 72 and 74 and the cable 58 is trained over opposite sides of the pulleys 70 and 76.

The distance between the pulleys 70 and 72 and 74 and 76 are exaggerated in FIG. 2 to facilitate illustration of the routing of the cables 52 and 58 between the drive sprocket 40 and the driven sprocket 42. In actual practice, the pulleys in each of the sets 66 and 68 can be immediately next to each other.

Means are provided for adjustably mounting at least one of the pulley sets 66 and 68 relative to the cables 52 and 58 so that the degree of tension applied on the cables by the pulleys can be increased to remove slack therefrom. In the specific construction illustrated, the second pulley set 68 is rotatably carried on a bracket 80 including an elongated slot 82 extending generally transversely to the travel direction of the cables 52 and 58. The bracket 80 is adjustably mounted on the vehicle frame 12 by a bolt 84 extending through the slot 82. Slack can be removed from the cables 52 and 58 by loosening the bolt 84, moving the bracket 80 (toward the bottom of the sheet as used in FIG. 2) to increase the tension applied on the cables 52 and 58 by the pulleys 74 and 76, respectively, and then tightening the bolt 84.

With the cable routing illustrated by solid lines in FIG. 2, the driven sprocket 42 and the steering shaft 26 rotate in the same direction as the stub shaft 36 and the drive sprocket 40. The rotational direction of the driven sprocket 42 relative to the drive sprocket 40 can be reversed, if desired, by crossing the cable 52 and 58 as illustrated by the dashed lines in FIG. 2.

In FIG. 2, the cable 58 is trained over the upper pulley 70 in the first pulley set 66 and over the lower pulley 76 in the second pulley set 68 and the cable 52 is trained over the lower pulley 72 in the first pulley set 66 and the upper pulley 74 in the second pulley set 68. If desired, one cable can be trained over the upper pulley on both sets and the other cable trained over the lower pulley on both sets.

The steering system provided by the invention has several advantages. For instance, the steering ratio can be changed by varying the number of teeth on either or both the drive sprocket and the driven sprocket. This can be accomplished by simply using commercially available sprockets having the appropriate number of teeth. Space requirements are minimized because the vertical clearance in the vicinity of the drive and driven sprockets need not be much more than the width of the chain, as compared to cable systems including a spool or wheel on which the cable is wound and a relatively thick drive pulley to which the cable is anchored. A circuitous routing between the steering wheel shaft and the steering unit shaft to avoid obstructions can be accommodated without complicated and potentially unreliable mechanisms. The cables do not have to be extremely tight to avoid slippage as is the case in many cable systems.

Various of the features of the invention are set forth in the following claims:

I claim:

1. A steering system for a vehicle including a frame and a steerable dirigible wheel unit rotatably mounted on the frame for rotation about a steering axis to steer the vehicle, said steering system including a rotatable steering control member rotatably supported from the frame at a location remote from the dirigible wheel unit, a drive sprocket mounted for common rotation with said steering control member, a first section of chain trained about said drive sprocket, a driven sprocket mounted for common rotation with the dirigible wheel about the steering axis, a second section of chain trained above said driven sprocket, a first set of two coaxially aligned pulleys rotatably mounted on the frame between said drive and driven sprockets, a second set of two coaxially aligned pulleys rotatably mounted on the frame between said first set of pulleys and said driven sprocket, and first and second flexible members interconnecting the ends of said first and second chain sections such that said driven sprocket is rotated in response to rotation of said drive sprocket, said first and second flexible members being trained over the same side of separate ones of said pulleys in each of said sets.

2. A steering system according to claim 1 including means adjustably mounting one of said sets of pulleys relative to said first and second flexible members for adjusting the tension applied on said flexible members by said one set of pulleys so as to remove slack therefrom.

3. A steering system according to claim 1 wherein said first and second flexible members are wire cables.

4. A steering system according to claim 1 wherein said flexible members are trained over one side of the pulleys of one of said sets and are trained over the opposite side of the pulleys of the other of said sets.

5. A steering system according to claim 1 wherein said first and second flexible members are interconnected with said chain sections in crossing relationship such that rotation of said drive sprocket in one direction causes rotation of said driven sprocket in the opposite direction.

6. A steering system according to claim 1 wherein each of said pulley sets includes an upper pulley and a lower pulley, wherein said first flexible member is trained over one side of the upper pulley in said first set and over the opposite side of the lower pulley in said second set, and wherein said second flexible member is trained over one side of the lower pulley in said first set and is trained over the opposite side of the upper pulley in said second set.

7. A steering system according to claim 1 wherein said first and second flexible members are interconnected with said chain sections in crossing relationship such that rotation of said drive sprocket in one direction causes rotation of said driven sprocket in the same direction.

* * * * *